(12) United States Patent
Monti et al.

(10) Patent No.: US 11,465,551 B2
(45) Date of Patent: Oct. 11, 2022

(54) AUTOMOTIVE LIGHTING APPARATUS AND RELATIVE CONTROL METHOD

(71) Applicant: Marelli Automotive Lighting Italy S.p.A. Con Socio Unico, Venaria Reale (IT)

(72) Inventors: Desiree Monti, Tolmezzo (IT); Michele Antonipieri, Tolmezzo (IT); Daniele Petris, Tolmezzo (IT); Fabio Leone, Tolmezzo (IT)

(73) Assignee: Marelli Automotive Lighting Italy S.p.A. Con Unico Socio, Venaria Reale (IT)

( * ) Notice: Subject to any disclaimer, the term of this patent is extended or adjusted under 35 U.S.C. 154(b) by 40 days.

(21) Appl. No.: 17/125,334

(22) Filed: Dec. 17, 2020

(65) Prior Publication Data
US 2021/0188158 A1 Jun. 24, 2021

(30) Foreign Application Priority Data

Dec. 20, 2019 (EP) .................................... 19219036
Oct. 9, 2020 (EP) .................................... 20201140
Oct. 26, 2020 (EP) .................................... 20203958

(51) Int. Cl.
  *B60Q 1/14* (2006.01)
  *F21S 41/24* (2018.01)
  *F21S 41/16* (2018.01)

(52) U.S. Cl.
  CPC ............ *B60Q 1/1423* (2013.01); *F21S 41/24* (2018.01); *F21S 41/16* (2018.01)

(58) Field of Classification Search
  CPC .............. F21S 41/24; F21S 43/14; F21K 9/61
  See application file for complete search history.

(56) References Cited

U.S. PATENT DOCUMENTS 4,837,448 A * 6/1989 Sainte Luce Banchelin ...............
  G02B 6/443
  250/519.1
10,222,529 B1 * 3/2019 Cohoon ................. G02B 6/001
(Continued)

FOREIGN PATENT DOCUMENTS

DE 102011015161 A1 5/2012
DE 102012215702 A1 3/2014
(Continued)

OTHER PUBLICATIONS

European Search Report dated Jul. 7, 2020 for European Patent Application 19219036.1.
(Continued)

*Primary Examiner* — Alexander H Taningco
*Assistant Examiner* — Jianzi Chen
(74) *Attorney, Agent, or Firm* — McCarter & English, LLP

(57) ABSTRACT

An automotive lighting apparatus is provided that includes a rear body which is adapted to be fixed to the outside or to the inside of the vehicle; a front half-shell arranged to close the mouth of said rear body; and at least one lighting assembly which is located inside the rear body and is adapted to backlight, on command, a corresponding transparent or semi-transparent sector of the front half-shell; the lighting assembly including a radially emitting optical fibre of given length; an electrically-powered, collimated light source which is located in front of a proximal end of the optical fibre, and is adapted to direct, towards the same proximal end, a collimated light beam that enters and travels inside the optical fibre; at least one proximal photometric sensor which is arranged beside the collimated light source and/or the proximal end of the optical fibre so as to capture/detect the light reflected/scattered on entering into the optical fibre; at least one distal photometric sensor which is (Continued)

located in front of the distal end of the optical fibre, and is adapted to capture/detect the light exiting from the distal end of the optical fibre; and an electronic control unit which is adapted to command the collimated light source on the basis of the signals coming from said proximal and distal photometric sensors.

16 Claims, 5 Drawing Sheets

(56) References Cited

U.S. PATENT DOCUMENTS

| | | | |
|---|---|---|---|
| 2003/0043589 A1* | 3/2003 | Blank | B60Q 1/2665 |
| | | | 362/276 |
| 2011/0084609 A1 | 4/2011 | Kawaguchi et al. | |
| 2013/0181896 A1* | 7/2013 | Gruhlke | G06F 3/017 |
| | | | 345/156 |
| 2013/0265563 A1* | 10/2013 | Vogt | G01S 7/495 |
| | | | 356/4.01 |
| 2016/0245471 A1* | 8/2016 | Nakazato | F21S 41/18 |
| 2017/0269787 A1* | 9/2017 | Eriksson | G06F 3/041 |
| 2018/0094790 A1* | 4/2018 | Greene | H05B 45/10 |
| 2018/0128682 A1* | 5/2018 | Nissim | G01J 3/26 |
| 2018/0213617 A1 | 7/2018 | Regau | |
| 2018/0317757 A1* | 11/2018 | Hayashi | G02B 23/2469 |
| 2020/0033529 A1* | 1/2020 | Grammer | F21S 41/321 |

FOREIGN PATENT DOCUMENTS

| | | |
|---|---|---|
| DE | 102015209013 A1 | 8/2016 |
| DE | 102015205353 A1 | 9/2016 |
| DE | 102016210363 A1 | 12/2017 |
| DE | 102018100410 B3 | 5/2019 |
| EP | 3385612 | 10/2018 |
| KR | 20160012467 | 2/2016 |

OTHER PUBLICATIONS

European Search Report dated Feb. 25, 2021 for European Patent Application 20201140.9-1012.
European Search Report dated Apr. 1, 2021 for European Patent Application 20203958.2-1012.

* cited by examiner

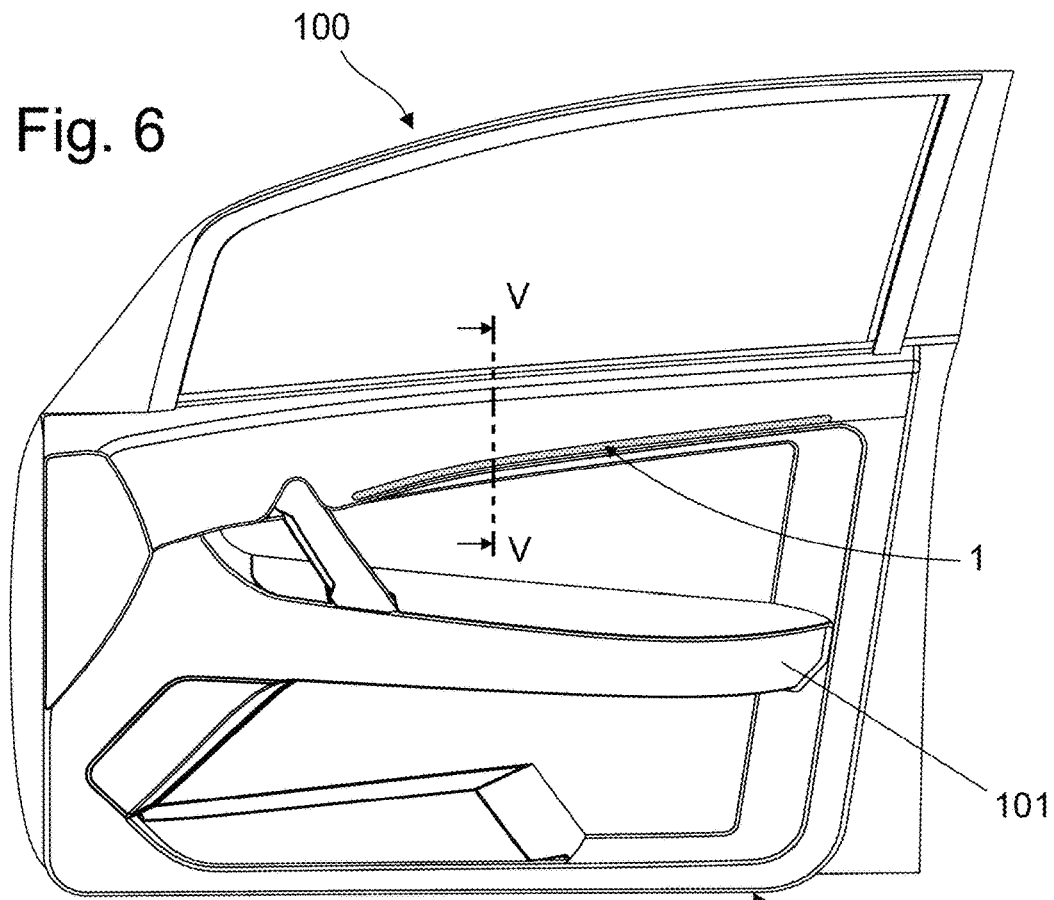
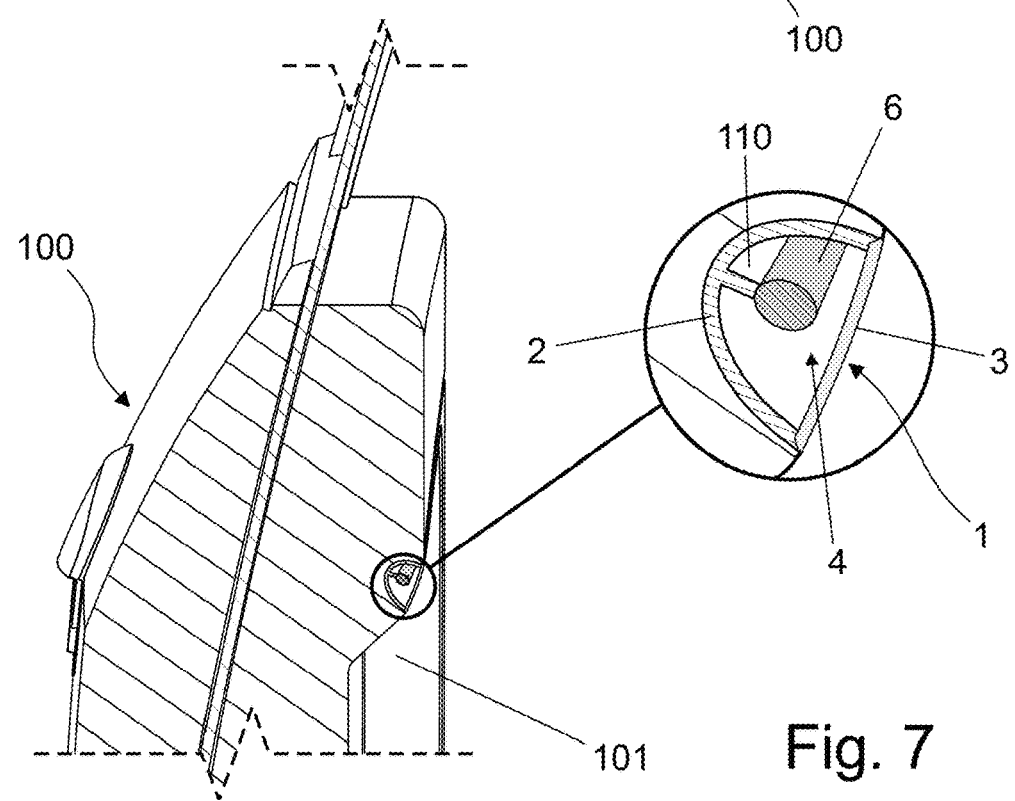

AUTOMOTIVE LIGHTING APPARATUS AND RELATIVE CONTROL METHOD

CROSS-REFERENCE TO RELATED APPLICATIONS

This application claims priority benefit from European Patent Application No. 19219036.1, filed on Dec. 20, 2019, European Patent Application No. 20201140.9, filed on Oct. 9, 2020, and European Patent Application No. 20203958.2, filed on Oct. 26, 2020, the entire disclosures of which are incorporated herein by reference.

TECHNICAL FIELD

The present invention relates to an automotive lighting apparatus and the control method thereof.

More specifically, the present invention relates to a headlight or taillight for cars and similar vehicles, i.e. a lighting apparatus adapted to be incorporated in a motor vehicle with the function of signalling the position, the sudden deceleration and/or the turning direction, and/or with the function of lighting the area surrounding the vehicle. Use to which the following disclosure will make explicit reference without however losing in generality.

BACKGROUND ART

As is known, the taillights for cars and the like generally comprise: a rigid and substantially basin-shaped rear body, which is structured so as to be stably recessed into a compartment specially realized in the rear part of the bodywork of the vehicle; a front half-shell which is arranged to close the mouth of the rear body so as to surface outside the bodywork of the vehicle, and is generally provided with a plurality of transparent or semi-transparent sectors, usually with a colour different from one another; and a series of lighting assemblies that are located inside the rear body, each immediately beneath a respective transparent or semi-transparent sector of the front half-shell, so as to be able to selectively backlight the overlying transparent or semi-transparent sector of the front half-shell.

Usually, each transparent or semi-transparent sector of the front half-shell is moreover uniquely associated with a specific light signal adapted to signal the position of the vehicle, the sudden deceleration of the vehicle or the turning direction of the vehicle during travel. Each lighting assembly, therefore, is specifically structured to emit, on command, a light beam that, once coming out from the taillight through the corresponding transparent or semi-transparent sector of the half-shell, meets the approval specifications (colour and light distribution) required for a corresponding light signal.

Over the last few years, some car manufacturers have chosen to equip their new car models with taillights in which the front half-shell is provided with one or more transparent or semi-transparent, oblong and ribbon-like sectors, i.e. with a narrow and very elongated shape.

The lighting assemblies that have to backlight the single transparent or semi-transparent ribbon-like sectors of the front half-shell usually comprise: a light-guide bar which is made of polymethylmethacrylate (PMMA) or other photo-con-ductive material and extends inside the rear body skimmed over the ribbon-like sector to be backlit, substantially for the entire length of the same sector; and one or more high-power LEDs (acronym for Light Emitting Diode) that are fixed on a small printed circuit board which, in turn, is placed inside the rear body, close to at least one of the two ends of the light-guide bar, so that the LED(s) abut on the end of the light-guide bar and can direct the light directly into the body of the light-guide bar.

Light that then travels inside the body of the light-guide bar by total internal reflection, and progressively exits from the lateral side of the light-guide bar which is directly facing the front half-shell, so as to be able to backlight the overlying transparent or semi-transparent sector of the half-shell.

Despite working very well, the backlighting system of the ribbon-like sectors of the front half-shell makes the assembly of the taillight relatively laborious.

The light-guide bar, in fact, is notoriously a hard and rigid, but relatively fragile, monolithic body thus it must be inserted into the rear body with due care. In addition, the or both ends of the light-guide bar must be perfectly aligned with the LEDs to avoid light leaks, and this contributes in lengthening the assembly time of the headlight.

To simplify and speed up the assembly of the automotive lights, some manufacturers of lights for cars and the like have recently replaced the light-guide bar of the lighting assembly with a radially emitting optical fibre, which is notoriously much more flexible than a light-guide bar made of polymethylmethacrylate (PMMA).

At the same time, the high-power LED(s) have been replaced by a small laser emitter which is mechanically coupled to one of the two ends of the radially emitting optical fibre by means of a fixing ferrule, which holds the end of the optical fibre in place in front of the laser emitter.

Unfortunately, despite working very well, the new lighting assemblies have proved to be potentially very dangerous in the event of a breakage of the taillight following a car accident.

Experimental tests, in fact, have shown that, in the event of a breakage of the front half-shell of the light, the optical fibre can break up and move from its seat allowing the laser light to freely come out of the light, with all the safety problems that this entails.

The laser beam emitted by the laser emitter of the headlight, in fact, generally has such an intensity that it can irreparably damage the human eye, and a broken and free-to-move optical fibre theoretically could accidentally direct the laser light outside the light, towards the eye of a person stationary inside the vehicle or in the immediate nearby of the vehicle, with the physical damage that this entails.

SUMMARY

Aim of the present invention is to increase the active safety of the new lighting assemblies that use optical fibres to backlight the front half-shell of the light.

In accordance with these aims, according to the present invention there is provided an automotive lighting apparatus comprising: a rear body adapted to be fixed to the vehicle; a front half-shell arranged to close the mouth of said rear body; and at least one lighting assembly which is located inside the rear body and is adapted to backlight, on command, a corresponding transparent or semi-transparent sector of the front half-shell;

said lighting assembly comprising: a radially emitting optical fibre of given length; and an electrically-powered, collimated light source which is located in front of a proximal end of the optical fibre, and is adapted to direct, towards the same proximal end, a collimated light beam that enters and travels inside the optical fibre;

the lighting apparatus being characterized in that said lighting assembly moreover comprises: at least one proximal photometric sensor that is arranged beside the collimated light source and/or the proximal end of the optical fibre, so as to capture/detect the light reflected/scattered on entering into the optical fibre; at least one distal photometric sensor that is arranged in front of the distal end of the optical fibre and is adapted to capture/detect the light coming out of the distal end of the optical fibre; and an electronic control unit adapted to command the collimated light source on the basis of the signals coming from said proximal and distal photometric sensors.

According to the present invention there is provided an automotive lighting apparatus provided with a lighting assembly and characterized in that said lighting assembly comprises: a radially emitting optical fibre of given length; a collimated light source which is arranged in front of a proximal end of said optical fibre, and is adapted to direct, towards the same proximal end, a collimated light beam which enters and travels inside the optical fibre; at least one proximal photometric sensor which is arranged beside the collimated light source and/or the proximal end of the optical fibre, so as to capture/detect the light reflected/scattered on entering into the optical fibre; at least one distal photometric sensor which is arranged in front of the distal end of the optical fibre and is adapted to capture/detect the light coming out of the distal end of the optical fibre; and an electronic control unit which is adapted to command said collimated light source on the basis of the signals coming from said proximal and distal photometric sensors.

According to the present invention there is also provided a control method of an automotive lighting apparatus provided with a lighting assembly that comprises: a radially emitting optical fibre of given length; a collimated light source which is arranged in front of a proximal end of said optical fibre, and is adapted to direct, towards the same proximal end, a collimated light beam which enters into and travels inside the optical fibre; at least one proximal photometric sensor which is arranged beside the collimated light source and/or the proximal end of the optical fibre, so as to capture/detect the light reflected/scattered on entering into the optical fibre; and at least one distal photometric sensor which is arranged in front of the distal end of the optical fibre and is adapted to capture/detect the light coming out of the distal end of the optical fibre;

the control method being characterised by comprising the step of:

determining the intensity of the light reflected/dispersed outside of the optical fibre at the proximal end of the fibre, on the basis of the signals coming from said at least one proximal photometric sensor;

determining the intensity of the light exiting from the distal end of the optical fibre on the basis of the signals coming from said at least one distal photometric sensor; and switching off/deactivating the collimated light source as a function of the intensity of the light detected by said at least one proximal photometric sensor and/or of the intensity of the light detected by said at least one distal photometric sensor.

BRIEF DESCRIPTION OF THE DRAWINGS

The present invention will now be described with reference to the attached drawings, which illustrate a non-limiting embodiment thereof, in which:

FIG. 6 is a front view of the door of a car provided with a lighting apparatus realized according to the teachings of the present invention, with parts removed for clarity's sake; whereas FIG. 7 is a partial side view of the door shown in FIG. 6, sectioned along the section line V-V and with parts removed for clarity's sake.

DETAILED DESCRIPTION OF THE INVENTION

Figure 1:
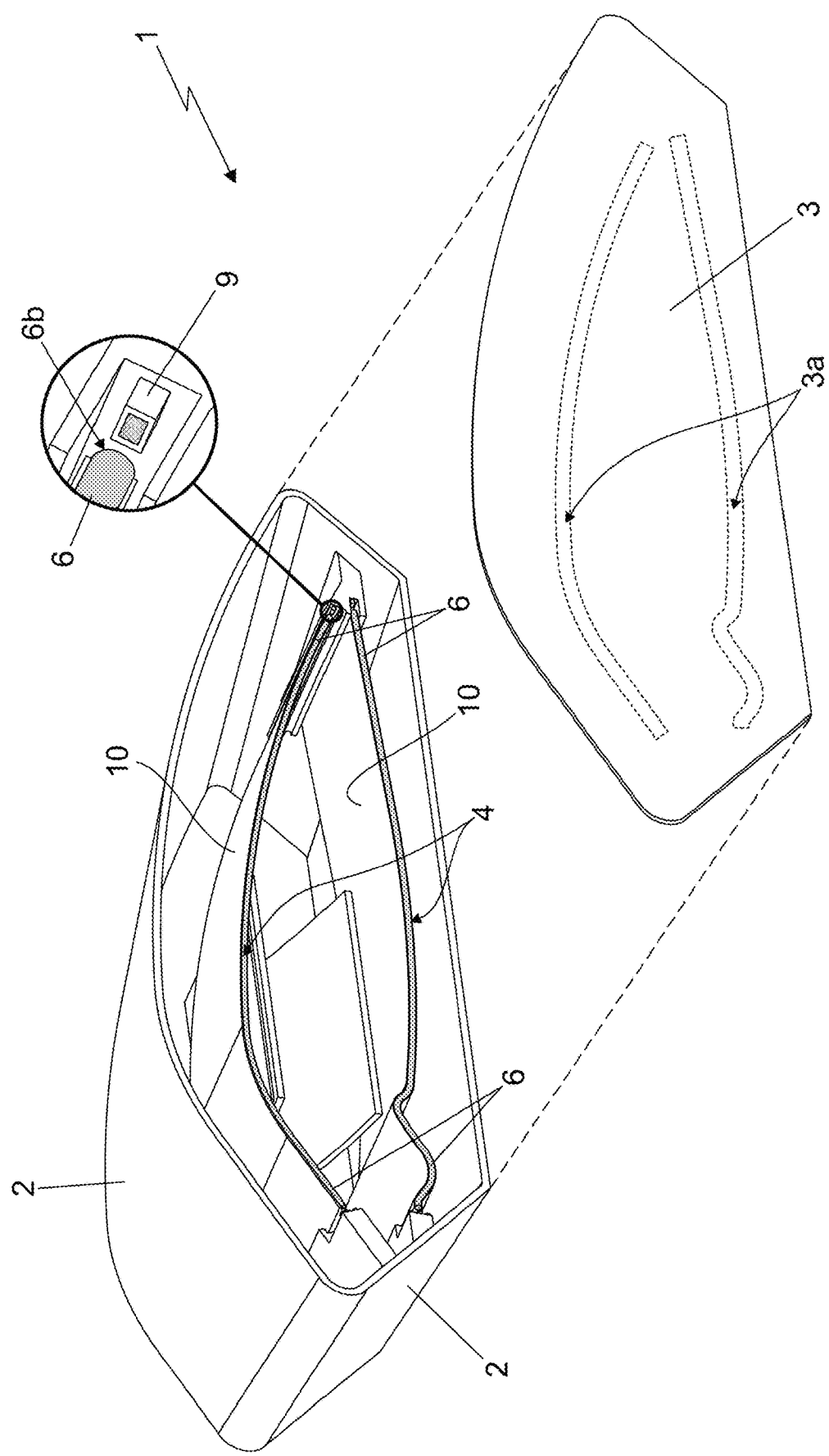
FIG. 1 is a partially exploded, perspective view of an automotive light realized according to the teachings of the present invention, with parts removed for clarity's sake.
Figure 2:
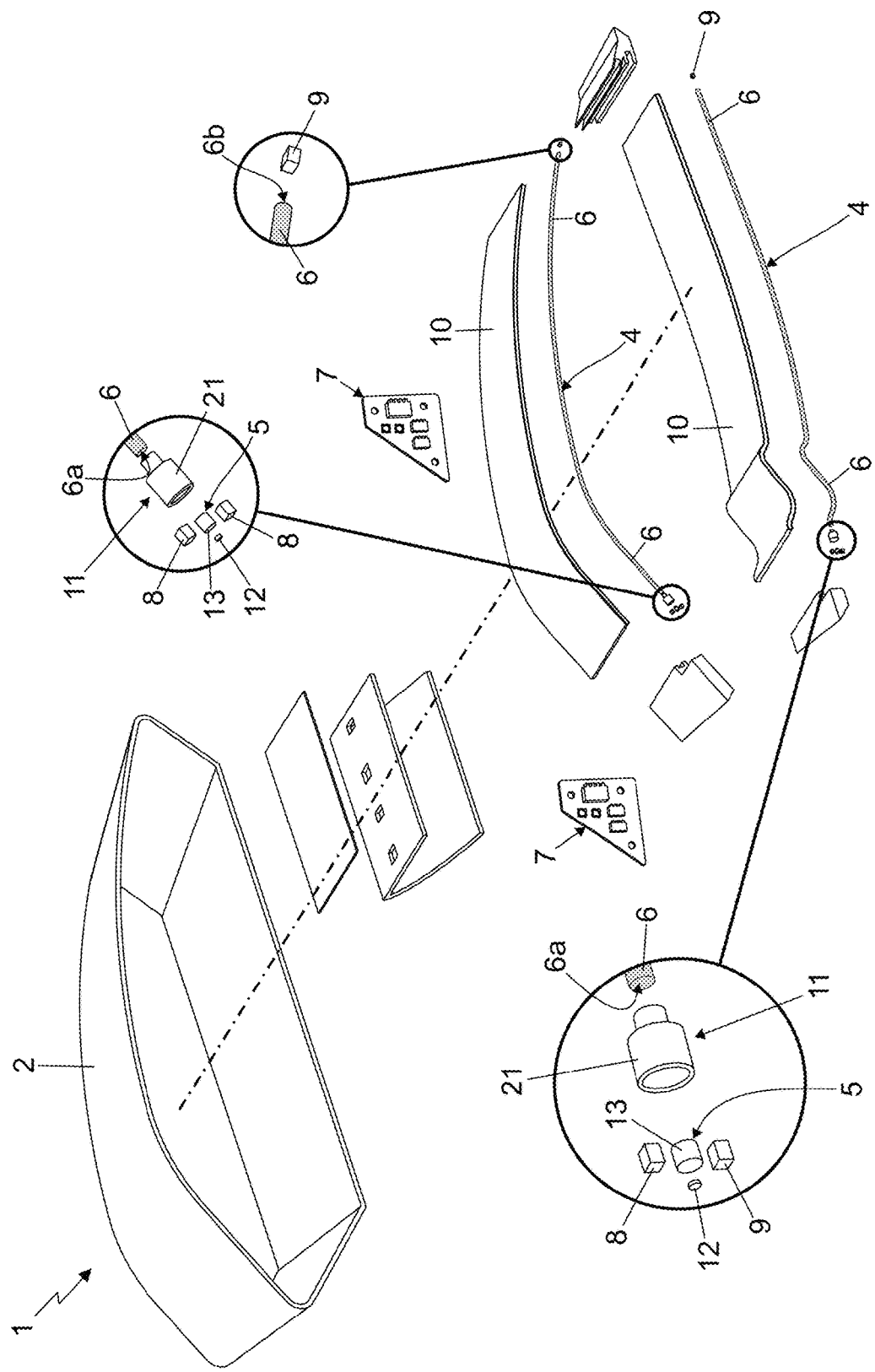
FIG. 2 is an exploded perspective view of the backlighting system of the automotive light shown in FIG. 1, with parts removed for clarity's sake.
Figure 3:
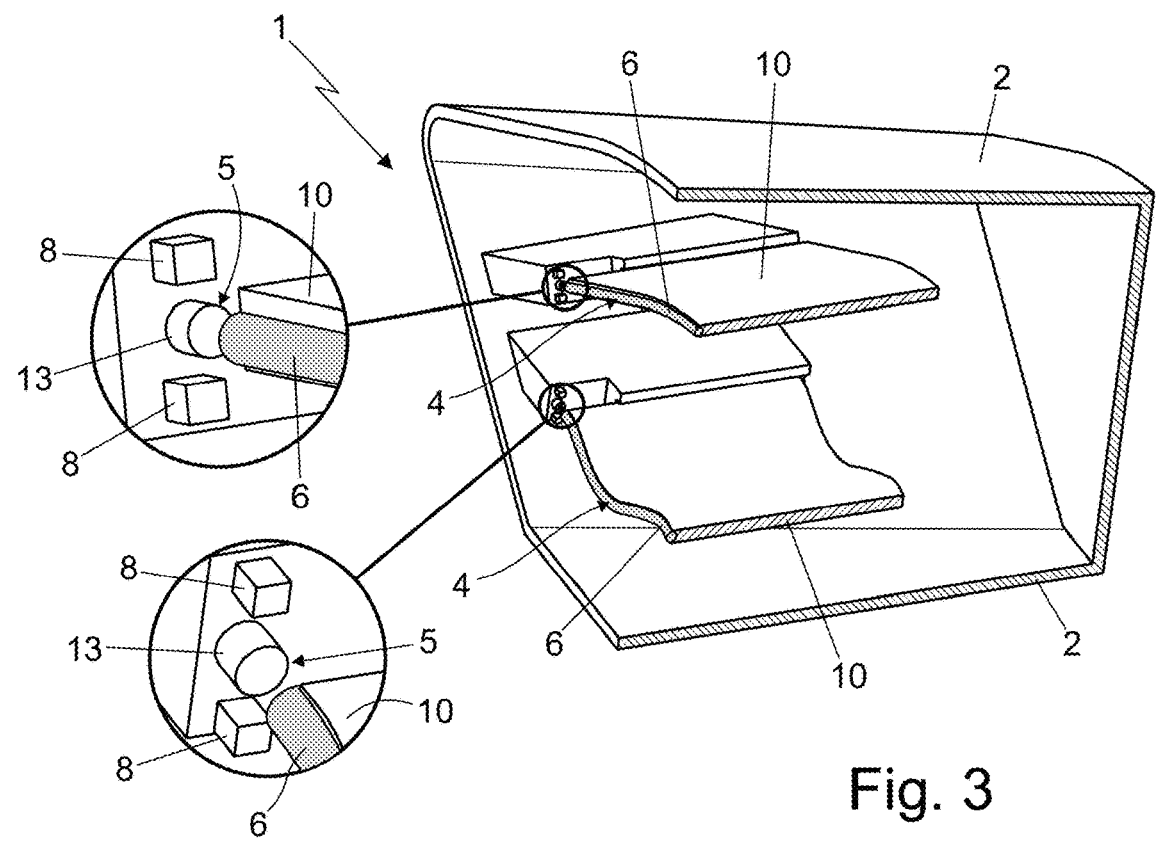
FIG. 3 is a sectional view of a portion of the automotive light of FIG. 1, with parts removed for clarity's sake.

With reference to FIGS. 1, 2 and 3, number 1 denotes as a whole a lighting apparatus for automotive use, i.e. a lighting apparatus adapted to be mounted in a motor vehicle.

More in detail, the lighting apparatus 1 is preferably an automotive light, i.e. a lighting device particularly adapted to be placed on the front or rear part of the bodywork of a motor vehicle, with the function of emitting light signals adapted to signal the position of the vehicle and/or the sudden deceleration of the vehicle and/or the turning direction of the vehicle during travel.

In other words, the lighting apparatus 1 is adapted to be fixed to the front or rear part of the bodywork of a car, van, truck, motorcycle or other similar motor vehicle, to perform the function of a headlight or taillight.

Preferably the lighting apparatus 1 is moreover structured so as to surface outside of the vehicle.

In the example shown, in particular, the lighting apparatus 1 is preferably structured to be stably recessed in the rear part of the bodywork of a car or other similar motor vehicle.

In other words, the lighting apparatus 1 is preferably a taillight for cars and the like.

Obviously, in a different embodiment the lighting apparatus 1 could also be structured so as to be simply fixed cantilevered on the front or rear part of the bodywork of the vehicle (not shown).

With reference to FIGS. 1, 2 and 3, the lighting apparatus 1 firstly comprises: a substantially rigid and preferably made of plastic material, rear body 2 which is adapted to be firmly fixed to the vehicle, preferably outside of the vehicle; and a substantially rigid and preferably made of plastic material, front half-shell 3, traditionally called a lens, which is arranged to close the mouth of rear shell 2, preferably so as to be able to surface outside the bodywork of the vehicle.

More in detail, the rear body 2 is preferably substantially basin-shaped, and is preferably structured so as to be at least partially recessed into a seat specially made in the rear part of the bodywork of the vehicle (not shown).

Obviously, in a different embodiment the rear body 2 could also be structured so as to be simply fixed cantilevered on the rear part of the bodywork of the vehicle (not shown).

In addition, the lighting apparatus 1 moreover comprises one or more electrically-powered lighting assemblies that emit light on command and are placed inside the rear body 2, each beneath a respective transparent or semi-transparent sector of front half-shell 3, so as to be able to selectively backlight the overlying transparent or semi-transparent sector of front half-shell 3.

More in detail, in the example shown the rear body 2 is preferably made of an opaque plastic material, preferably via an injection moulding process.

The front half-shell 3, on the other hand, is preferably made of a transparent or semi-transparent plastic material, such as for example polycarbonate (PC) or polymethylmethacrylate (PMMA), also in this case preferably via an injection moulding process.

In the example shown, moreover, the lighting apparatus 1 is preferably provided with a plurality of electrically-powered lighting assemblies, each of which is located inside the rear body 2 in a position such as to be able to backlight only the overlying and corresponding transparent or semi-transparent sector of front half-shell 3, preferably separately and independently from the other lighting assemblies of the lighting apparatus.

With reference to FIGS. 1, 2, 3 and 4, at least one of the lighting assemblies, hereafter denoted with the number 4, moreover comprises: a laser light source 5 which is placed inside the rear body 2 and is capable of emitting, on command, a laser beam r (i.e. an extremely concentrated and collimated, coherent and monochromatic light beam); and an optical fibre 6 of given length and preferably with a flexible filiform structure, which extends inside the rear body 2 and has one of its two ends, hereinafter called proximal end, faced and optically coupled to the laser light source 5 so that the laser beam r emitted by the laser light source 5 can freely enter into the optical fibre 6 and travel inside it.

In addition, the lighting assembly 4 moreover comprises an electronic control unit 7 that commands the laser light source 5, and is preferably placed inside the rear body 2, optionally close to the bottom of the same rear body 2. The electronic control unit 7 is adapted to activate and deactivate the laser light source 5 on the basis of an external command signal.

In other words, the external command signal commands the emission of the laser beam r.

The optical fibre 6, in addition, is specifically structured so as to be able to gradually diffuse outwards, preferably substantially along its entire length, the laser light that travels inside itself. In other words, the optical fibre 6 is a radially emitting optical fibre.

More in detail, the optical fibre 6 has a proximal end 6a and a distal end 6b, opposite to the proximal end 6a.

The laser light source 5 is arranged inside the rear body 2, facing the proximal end 6a of optical fibre 6, and is adapted to emit, on command and towards the proximal end 6a, a laser beam r that enters and travels inside the optical fibre 6, towards the distal end 6b.

More in detail, the proximal end 6a of optical fibre 6 is arranged spaced in front of the emitter of laser light source 5, at a distance d from the emitter of laser light source 5 preferably lower than or equal to 0.5 mm (millimetres) and more conveniently ranging between 0.1 and 0.3 mm (millimetres).

The optical fibre 6, in turn, is specifically structured to channel the entering laser light towards its own distal end 6b, simultaneously and progressively diffusing, outside of the same optical fibre 6 and substantially in a radial direction, a predetermined percentage of the laser light as the light travels inside the same optical fibre 6.

In addition the lighting assembly 4 also comprises: at least one proximal photometric sensor 8 which is arranged beside the emitter of laser light source 5 and/or the proximal end 6a of optical fibre 6, so as to capture/detect the laser light which is reflected/dispersed outside of the optical fibre 6 when the laser beam r enters the proximal end 6a of optical fibre 6; and at least one distal photometric sensor 9 which is placed in front of the distal end 6b of optical fibre 6, and is adapted to capture/detect the laser light exiting from the distal end 6b of optical fibre 6.

The electronic control unit 7, in turn, is adapted to command the laser light source 5 additionally on the basis of the signals coming from the proximal and distal photometric sensors 8 and 9.

More in detail, the electronic control unit 7 is preferably programmed/configured so as to autonomously deactivate the laser light source 5 to interrupt/prevent the emission of the laser beam r, when the ratio between the intensity of the light reflected/dispersed outside of the optical fibre 6, at the proximal end 6a of the fibre, and the intensity of the light coming out from the distal end 6b of the fibre, deviates from a predetermined reference value.

Clearly, said reference value is a constructive parameter which is a function of the structural characteristics of the optical fibre 6, such as for example the length of the optical fibre and/or the radial emittance/dispersion coefficient of the optical fibre.

Preferably, said reference value is moreover stored inside the electronic control unit 7.

In other words, the electronic control unit 7 is preferably programmed/configured so as to autonomously deactivate the laser light source 5 to interrupt/prevent the emission of the laser beam r, when the ratio between the intensity of the laser light detected by the proximal photometric sensor 8 and the intensity of the laser light detected by the distal photometric sensor 9 deviates from said predetermined reference value.

With reference to FIGS. 1, 2 and 3, in the example shown, in particular, the front half-shell 3 preferably has at least one transparent or semi-transparent sector 3a (two sectors in the example shown) with a narrow and elongated shape, i.e. substantially ribbon-like.

The lighting assembly 4 adapted to selectively backlight the/each transparent or semi-transparent ribbon-like sector 3a of front half-shell 3, preferably comprises: a radially emitting optical fibre 6 that extends inside the rear shell 2 so that at least a portion/segment of the optical fibre is locally substantially skimmed over the ribbon-like sector 3a to be backlit, preferably substantially for the entire length of the same ribbon-like sector 3a; and an electrically-powered laser light source 5 which is capable of emitting, on command, a laser beam r and is placed inside the rear body 2 directly facing and aligned to the proximal end 6a of the optical fibre 6, so that the laser beam r exiting from the emitter of the laser light source 5 can freely enter into the optical fibre 6 through said proximal end 6a.

Preferably, the optical fibre 6 moreover has an external diameter lower than 5 mm (millimetres) and more conveniently lower than 1.2 mm (millimetres).

Moreover, with reference to FIGS. 1, 2 and 3, the optical fibre 6 is preferably also sustained/supported by a rigid bearing structure, which is integral with rear body 2 and is preferably made of plastic material.

More in detail, the optical fibre 6 is preferably fixed on the front lateral side of a rigid and preferably made of opaque plastic material, support plate 10 which is arranged inside the rear body 2 with its front side directly facing the front half-shell 3, or rather to the corresponding ribbon-like sector 3a preferably substantially for the entire length of the same ribbon-like sector 3a, and with its rear side facing the bottom of rear body 2. Clearly, the support plate 10 could also protrude cantilevered manner from the bottom of rear body 2.

Figure 4:
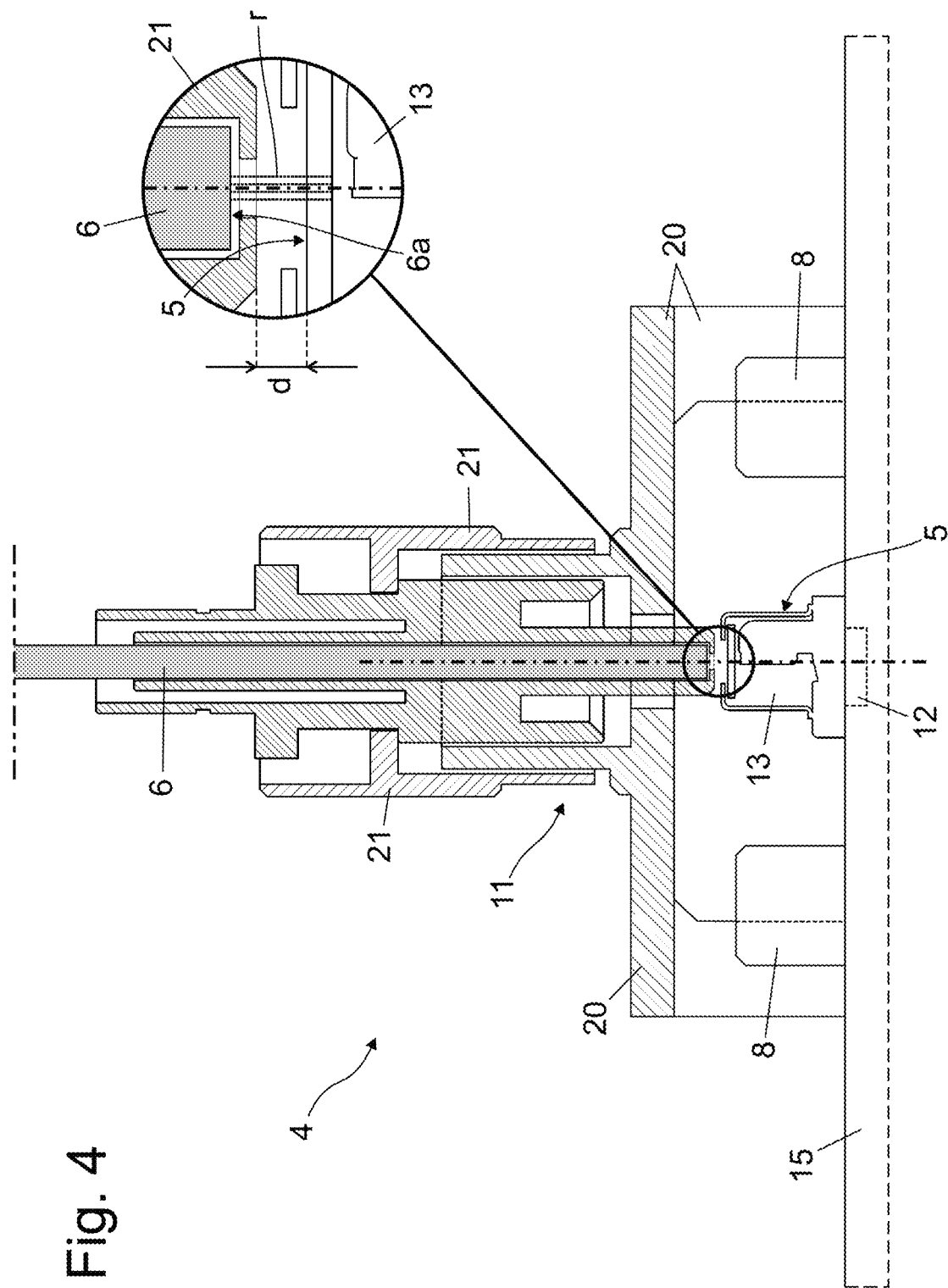
FIG. 4 is a sectional schematic view of the coupling system between the laser emitter and the optical fibre of one of the lighting assemblies present in the light shown in the previous figures, with parts removed for clarity's sake.

With reference to FIGS. 2 and 4, moreover the lighting assembly 4 preferably also comprises centring and fixing mechanical members 11, which are adapted to rigidly connect the proximal end 6a of optical fibre 6 to the laser light source 5, or rather to the emitter of laser light source 5, and which are structured so as to stably keep the proximal end 6a of optical fibre 6 centred and stationary in front of the emitter of laser light source 5.

More in detail, the centring and fixing members 11 are preferably structured so as to keep the proximal end 6a of optical fibre 6 stationary in front of the emitter of the laser light source 5, at a distance d from the emitter lower than 0.5 mm (millimetres) and preferably ranging between 0.1 and 0.3 mm (millimetres).

In the example shown, in particular, the centring and fixing members 11 are preferably structured so as to stably keep the proximal end 6a of optical fibre 6 at a distance d from the emitter of the laser light source 5 ranging between 0.2 and 0.25 mm (millimetres).

The electronic control unit 7, in turn, is programmed/configured so as to activate and deactivate the laser light source 5 on the basis of the external command signal. In addition, the electronic control unit 7 is preferably also programmed/configured so as to automatically deactivate the laser light source 5 when the ratio between the intensity of the laser light detected by the proximal photometric sensor 8 and the intensity of the laser light detected by the distal photometric sensor 9 moves outside of a predetermined tolerance interval which is astride said reference value, and is preferably also substantially centred on said reference value.

More in detail, in the example shown the electronic control unit 7 is preferably programmed/configured so as to automatically deactivate the laser light source 5 when the ratio between the intensity of the laser light detected by the proximal photometric sensor 8 and the intensity of the laser light detected by the distal photometric sensor 9 moves away/deviates by at least 10% from said reference value.

In other words, in the example shown the tolerance interval preferably has a width equal to 20% of said reference value, and is preferably also centred on the same reference value.

Figure 5:
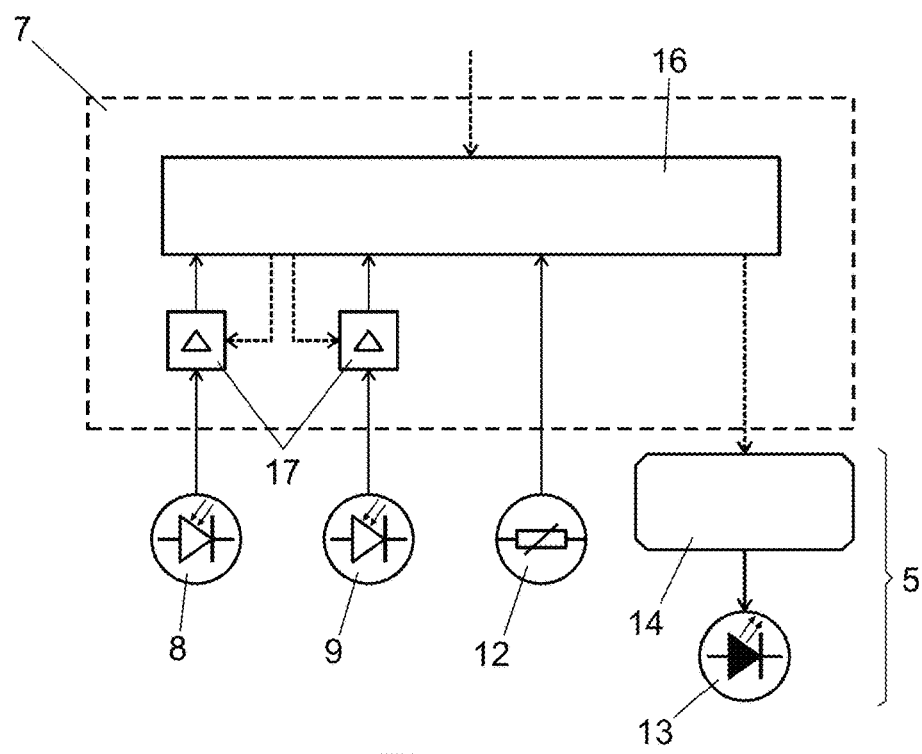
FIG. 5 is a schematic view of the electronics of one of the lighting assemblies present in the light shown in FIGS. 1, 2 and 3, with parts removed for clarity's sake.

With reference to FIGS. 2, 4 and 5, preferably the lighting assembly 4 moreover includes at least one temperature sensor 12 which is adapted to continuously detect the temperature of the laser light source 5, or rather of the emitter of laser light source 5.

In addition, the electronic control unit 7 is preferably also connected to the temperature sensor 12, and is adapted to amplify the signal coming from the proximal photometric sensor 8 and/or the signal coming from the distal photometric sensor 9 as a function of the current temperature of the laser light source 5, or rather of the emitter of the laser light source 5.

More in detail, electronic control unit 7 is preferably programmed/configured so as to increase the power/intensity of the signal coming from the proximal photometric sensor 8 and/or the power/intensity of the signal coming from the distal photometric sensor 9 as the temperature reached by the laser light source 5, or rather by the emitter of the laser light source 5, increases.

Even in more detail, in the example shown the electronic control unit 7 is preferably programmed/configured so as to amplify, as the temperature of the laser light source 5 increases and substantially with the same gain, both the signal coming from the proximal photometric sensor 8 and the signal coming from the distal photometric sensor 9.

With reference to FIGS. 2, 3, 4 and 5, in the example shown, in particular, the laser light source 5 preferably comprises: a LASER diode 13 which is adapted to emit the laser beam; and a driving module 14 that powers and/or controls the LASER diode 13.

Clearly, the LASER diode 13 is the emitter of the laser light source 5.

The lighting assembly 4, in addition, is preferably provided with at least two proximal photometric sensors 8 that are arranged beside the emitter of laser light source 5, or rather beside the LASER diode 13, on opposite sides of the emitter and preferably in a substantially specular position with respect to the latter.

In addition, the distance between the emitter of the laser light source 5, or rather the LASER diode 13, and the two proximal photometric sensors 8 is preferably lower than or equal to 10 mm (millimetres), and more conveniently ranging between 1 and 8 mm (millimetres).

Preferably the proximal photometric sensor(s) 8 and the laser light source 5, or rather the emitter of the laser light source 5, is/are moreover placed/fixed one next to the other, on a small printed circuit board 15 which, in turn, is placed/fixed inside the rear body 2 of the lighting apparatus, close to the proximal end 6a of optical fibre 6.

The temperature sensor 12, in addition, is preferably located on the printed circuit board 15, in contact with or in any case close to the emitter of the laser light source 5, or rather of the LASER diode 13.

In the example shown, in particular, the photometric sensors 8 and/or 9 are preferably photodiodes.

The LASER diode 13, on the other hand, is preferably a red or RGB LASER diode capable of emitting a laser beam with variable power and/or colour on command.

Clearly, the reference value for the automatic switch-off of the laser light source 5 can also be a function of the colour of the laser beam r emitted by the laser light source 5.

With reference to FIG. 5, preferably the electronic control unit 7, on the other hand, comprises a microprocessor 16 which receives at input the external command signal and the signals coming from the photometric sensors 8 and 9, and is adapted to command the driving module 14 of laser light source 5 as a function of these signals.

More in detail, the microprocessor 16 is preferably programmed/configured so as to command to the driving module 14 to activate/power the LASER diode 13, and thus to emit the laser beam r, only when the external command signal requires the lighting assembly 4 to be switched on.

In addition, the microprocessor 16 is preferably also programmed/configured so as to order the driving module 14 to immediately switch off/deactivate the LASER diode 13 when the ratio between the intensity of the light detected by the proximal photometric sensor(s) 8 and the intensity of the light detected by the distal photometric sensor 9 deviates excessively from said predetermined reference value.

More in detail, the microprocessor 16 is preferably programmed/configured so as to order the driving module 14 to immediately switch off/deactivate the LASER diode 13 when the ratio existing between the intensity of the light detected by the proximal photometric sensor(s) 8 and the intensity of the laser light detected by the distal photometric sensor 9 deviates from said reference value by an amount greater than a limit threshold preferably equal to 10% of the reference value.

Even more in detail, the microprocessor 16 is preferably programmed/configured so as to determine, continuously or cyclically, the intensity of the light reflected/dispersed outside of the optical fibre 6 at the proximal end 6a of the fibre, on the basis of the signals coming from the proximal photometric sensor(s) 8; and to determine, continuously or cyclically, the intensity of the light coming out from the distal end 6b of the fibre on the basis of the signals coming from the distal photometric sensor 9.

After determining the current value of the intensity of the light reflected/dispersed outside the optical fibre 6 at the proximal end 6a of the fibre and the current value of the intensity of the light coming out from the distal end 6b of the fibre, the microprocessor 16 is preferably programmed/configured so as to calculate the ratio that currently exists between the intensity of the light reflected/dispersed outside the optical fibre 6 at the proximal end 6a of the fibre, and the intensity of the light emanating from the distal end 6b of the fibre.

After calculating the current value of the ratio between the intensity of the light reflected/dispersed outside the optical fibre 6 at the proximal end 6a of the fibre and the intensity of the light coming out from the distal end 6b of the fibre, the microprocessor 16 is preferably programmed/configured so as to order the driving module 14 to immediately switch off/deactivate the LASER diode 13, if the difference between the predetermined reference value and the momentary value of the ratio between the intensity of the light reflected/dispersed outside of the optical fibre 6 at the proximal end 6a of the fibre, and the intensity of the light coming out from the distal end 6b of the fibre, exceeds said limit threshold.

With reference to FIG. 5, preferably the electronic control unit 7 additionally comprises, for each photometric sensor 8 and 9, also a signal amplifier 17 that is interposed between the microprocessor 16 and the corresponding photometric sensor 8, 9 and is adapted to amplify (i.e. increase the power/intensity of the signal) the signal directed towards the microprocessor 16.

The microprocessor 16, in addition, receives at input also the signal coming from the temperature sensor 12, and is preferably adapted to command the signal amplifiers 17 as a function of this signal.

More in detail, the microprocessor 16 is preferably programmed/configured so as to adjust the gain of the signal amplifiers 17 as a function of the signals coming from the temperature sensor 12.

Even in more detail, the microprocessor 16 is preferably programmed/configured so as to increase the gain of the signal amplifiers 17 as the temperature detected by the temperature sensor 12 increases.

With reference to FIG. 4, in the example shown, finally, the mechanical centring and fixing members 11 preferably comprise: a rigid and preferably made of plastic or metallic material, support socket 20 which is stably fixed on the printed circuit board 15 so as to extend as a bridge over the emitter of the laser light source 5, or rather over the LASER diode 13, and over the proximal photometric sensor(s) 8; and a ferrule connector 21 preferably made of metallic material, which is adapted to be fitted and firmly locked onto the proximal end 6a of optical fibre 6, locally coaxial to the optical fibre 6.

The ferrule connector 21 is adapted to be screwed onto a threaded portion of support socket 20 that is locally aligned to the emitter of the laser light source 5, or rather to the LASER diode 13, so as to arrange the proximal end 6a of optical fibre 6 spaced over the emitter of the laser light source 5, locally coaxial and at the distance d from the emitter of the laser light source 5, or rather from the LASER diode 13.

General operation of the automotive lighting apparatus 1 is easy inferable from what written above.

As regards instead the operation of lighting assembly 4, the electronic control unit 7 activates and deactivates the laser light source 5 on the basis of the external command signal.

Due to the air/glass interface, when the laser beam r enters the optical fibre 6 through the proximal end 6a, a very small amount of optical energy does not succeed in entering into the optical fibre 6 and is reflected back (Fresnel reflections), towards the laser light source 5 and towards the proximal photometric sensor(s) 8. The laser light reflected towards the laser light source 5 is detected by the proximal photometric sensor(s) 8.

Clearly, the intensity of the laser light reflected back towards the laser light source 5 is minimal, and has a value proportional to the power of the laser beam r generated by the laser light source 5.

In addition, if the power of the laser beam r does not vary, the intensity of the laser light reflected back towards the laser light source 5 remains substantially constant as long as the optical fibre 6 is perfectly aligned and coupled to the emitter of laser light source 5. Clearly, any variation of the position of the proximal end 6a of the optical fibre 6 with respect to the ideal position causes a variation in the intensity of the laser light detected by any one of the proximal photometric sensor(s) 8.

Consequently, if the power of the laser beam r does not vary, any variation in the light energy detected by the proximal photometric sensor(s) 8 is indicative of the breakage of the optical fibre 6, of the incorrect positioning of the optical fibre 6 with respect to the laser light source 5, perhaps due to the occurred breakage of the lighting apparatus 1, or to the incorrect optical assembly/coupling of the optical fibre 6 to the laser light source 5.

The distal photometric sensor 9, on the other hand, detects the intensity of the laser light exiting from the distal end 6b of the optical fibre 6. If the optical fibre 6 and the laser light source 5 are correctly dimensioned, the optical energy that reaches the distal end 6b of the optical fibre and is dispersed outside the optical fibre is minimal, but is still present.

Clearly, the intensity of the laser light exiting from the distal end 6b of the optical fibre is in any case proportional to the power of the laser beam r emitted by the laser light source 5.

Also in this case, if the power of the laser beam r does not vary, any variation of the light energy detected by the distal photometric sensor 9 is indicative of the breakage of the optical fibre 6, or of the incorrect positioning of the optical fibre 6 on the relative support structure, or rather on the side of support plate 10, probably due to the occurred breakage of the lighting apparatus.

The electronic control unit 7 is programmed/configured so as to activate and deactivate the laser light source 5 on the basis of the external command signal.

In addition, the electronic control unit 7 is programmed/configured to implement a control method that comprises the steps of:

determining the intensity of the light reflected/scattered outside of the optical fibre 6 at the proximal end 6a of the fibre, on the basis of the signals arriving from the proximal photometric sensor(s) 8;

determining the intensity of the light exiting from the distal end 6b of the optical fibre 6 on the basis of the signals arriving from the distal photometric sensor(s) 9; and switching off/deactivating the laser light source 5 as a function of the intensity of the light detected by the proximal photometric sensor(s) 8 and/or of the intensity of the light detected by the distal photometric sensor(s) 9.

More in detail, the control method preferably provides for switching off/deactivating the laser light source 5 when the ratio between the intensity of the light detected by the proximal photometric sensor(s) 8 and the intensity of the light detected by the distal photometric sensor(s) 9 deviates from a predetermined reference value In other words, the control method implemented by the electronic control unit 7 preferably comprises the steps of:

determining, continuously or cyclically, the intensity of the light reflected/dispersed outside the optical fibre 6 at the proximal end 6a of the fibre, on the basis of the signals coming from the proximal photometric sensor(s) 8;

determining, continuously or cyclically, the intensity of the light exiting from the distal end 6b of the fibre on the basis of the signals coming from the distal photometric sensor 9; and immediately switching off/deactivating the laser light source 5 when the ratio between the intensity of the light detected by the proximal photometric sensor(s) 8, and the intensity of the light detected by the distal photometric sensor(s) 9, deviates excessively from said predetermined reference value.

In the example shown, in particular, the limit threshold beyond which the automatic deactivation/switching off of the laser light source 5 takes place is preferably equal to 10% of the reference value.

By automatically deactivating the laser light source 5 when the ratio defined above deviates excessively from the said reference value, the electronic control unit 7 prevents, after an occurred breakage or malfunction of the lighting apparatus 1, the laser beam r exiting from the laser light source 5 from causing damages to property and/or people.

Preferably, the control method implemented by the electronic control unit 7 additionally also includes the step of measuring the temperature of the laser light source 5, or rather of the emitter of laser light source 5, and the step of amplifying the signals coming from the proximal photometric sensor(s) 8 and/or from the distal photometric sensor(s) 9 as a function of the temperature of the laser light source 5.

More in detail, the control method provides for increasing the power/intensity of the signals coming from the proximal photometric sensor(s) 8 and/or from the distal photometric sensor(s) 9 as the temperature of the laser light source 5, or rather of the emitter of the laser light source 5, increases.

In this way there are compensated the variations of signals coming from the proximal photometric sensor(s) 8 and/or from the distal photometric sensor(s) 9 due to the temperature variations of the laser light source 5.

Experimental tests, in fact, have shown that the power of the laser beam r emitted by the laser light source 5, and more in detail by the LASER diode 13, generally decreases more or less randomly as the component temperature increases.

The advantages connected to the particular structure of the lighting assembly 4 and to the control method described above are noteworthy.

Firstly, the lighting assembly 4 thus configured prevents the laser beam from being accidentally directed outside of the lighting apparatus 1 in the event of a broken or badly arranged optical fibre 6.

More in detail, the presence of the photometric sensors 8 and 9 makes it possible to control in real time the entry and exit of the light from the two ends of the optical fibre 6, promptly blocking the emission of the laser beam in the event of a broken or badly arranged optical fibre 6, thus enormously increasing the active safety of the lighting assembly 4 and, consequently, of the whole lighting apparatus 1.

In addition, the use of the ratio between the intensity of the light reflected/dispersed outside of the optical fibre 6 at the proximal end 6a of the fibre, and the intensity of the light exiting from the distal end 6b of the fibre, as a reference parameter for the automatic deactivation of the laser light source 5, makes the lighting assembly 4 very reliable and safe.

Experimental tests, in fact, have shown that, in the laser light sources currently on the market, the power of the emitted laser beam r can vary significantly and suddenly depending on the production batch of the laser light source 5, on the age of the laser light source 5, on the temperature reached by the emitter 13 of the laser light source 5, and/or on the intensity of the electric current circulating at that moment in the emitter 13 of the laser light source 5.

Monitoring the ratio between the intensity of the light reflected/dispersed outside of the optical fibre 6 at the proximal end 6a of the fibre and the intensity of the light exiting from the distal end 6b of the fibre, eliminates any influence due to any variation/fluctuation of the power of the laser beam r emitted by the laser light source 5.

In fact, both quantities vary according to the power of the laser beam r generated by the laser light source 5.

The deactivation of laser light source 5, therefore, is not affected by unexpected fluctuations in the power of the laser beam, due to the intensity of the electric current circulating at that moment in the emitter of the laser light source, to the temperature reached by the emitter of the laser light source and/or to the decay of the laser beam power owing to the age of the laser light source.

In addition, the deactivation of the laser light source 5 is no longer affected by the performance differences due to laser light sources 5 coming from different batches or manufacturers, greatly simplifying the manufacturing of lighting apparatus 1.

Finally, the combined use of the photometric sensors 8 and 9 makes it possible to understand, at the end of or along the production line of the lighting apparatus 1, if the assembly of the lighting apparatus 1, or rather of the lighting assembly 4, has taken place correctly, with the savings that this entails.

It is finally clear that modifications and variations can be made to the lighting apparatus 1 and to the lighting assembly 4 described above, without however departing from the scope of the present invention.

For example, the laser light source 5 of lighting assembly 4 could be replaced by a high-power LED and by an optical collimator that is placed over the LED and is adapted to collimate the light rays emitted by the LED into a collimated light beam (i.e. a set of collimated light rays in the same direction) directed towards the proximal end 6a of the radially emitting optical fibre 6.

In other words, in a less sophisticated embodiment, the laser light source 5 is replaced by a LED collimated light source.

In addition, the lighting apparatus 1 can also be placed inside the motor vehicle, for example to illuminate all or part of the passenger compartment of vehicle.

With reference to FIGS. 6 and 7, in particular, the lighting apparatus 1 can be advantageously placed/incorporated into the vehicle door 100 to illuminate the surrounding space.

In other words, the rear body 2 is adapted to be stably fixed to the vehicle, inside the latter.

In the example shown, in particular, the lighting apparatus 1 is preferably oblong in shape, and is preferably recessed into the inner covering panel 101 of the door 100 so as to form a light strip that illuminates the armrest area.

More in detail, in the example shown, the rear body 2 is preferably oblong in shape, and is stably fixed or incorporated into the panel 101 of door 100. The front half-shell 3, on the other hand, preferably has a ribbon-like structure and is arranged to close the mouth of rear body 2, preferably substantially for the whole length of rear body 2.

The optical fibre 6 extends inside the rear body 2, preferably substantially for the whole length of the latter.

Preferably, the optical fibre 6 is moreover fixed on the ridge of a longitudinal rib 110 that protrudes inside the rear body 2, preferably substantially for the entire length of the latter or of the optical fibre 6.

In addition, the internal surface of rear body 2 is preferably also mirror metallized so as to deflect the incident light towards the front half-shell 3.

In this embodiment, the proximal and distal photometric sensors 8 and 9 are placed inside the rear body 2, at the two ends of the rear body 2 or, in any case, at the proximal 6a and distal 6b ends of the optical fibre 6.

In other words, in this embodiment the lighting apparatus 1 is preferably provided with a single lighting assembly 4 which is adapted to backlight the entire front half-shell 3.

In addition, in this embodiment, the laser light source 5 can also be located outside of the rear body 2, preferably on the back of panel 101, i.e. inside the door 100.

Clearly, the lighting apparatus 1 can be incorporated also in the vehicle dashboard, for example to illuminate or backlight the perimeter of the instrument panel, or inside the central console, for example to illuminate or backlight a control panel placed therein.

Finally, in a different embodiment the electronic control unit 7 can be programmed/configured so as to autonomously deactivate the laser light source 5 to interrupt/prevent the emission of laser beam r, when intensity of the laser light detected by any one of the proximal 8 and distal 9 photometric sensors deviates from a corresponding predetermined reference value.

Preferably, this reference value is moreover a function of the power/intensity of the laser beam r emitted by the laser light source 5.

In other words, the electronic control unit 7 is programmed/configured so as to activate and deactivate the laser light source 5 on the basis of the external command signal.

In addition, the electronic control unit 7 is preferably programmed/configured so as to automatically deactivate the laser light source 5 when intensity of the laser light detected by the proximal photometric sensor 8 deviates from a first predetermined reference value, and/or when intensity of the laser light detected by the distal photometric sensor 9 deviates from a second predetermined reference value.

More in detail, the electronic control unit 7 is preferably programmed/configured so as to automatically deactivate the laser light source 5 when intensity of the laser light detected by the proximal photometric sensor 8 moves outside of a predetermined first tolerance interval, which is astride said first reference value, and is preferably also substantially centred on said first reference value.

Furthermore, the electronic control unit 7 is preferably programmed/configured so as to automatically deactivate the laser light source 5 when intensity of the laser light detected by the distal photometric sensor 9 moves outside of a predetermined second tolerance interval which is astride said second reference value, and is preferably also substantially centred on said second reference value.

More in detail, the electronic control unit 7 can be programmed/configured so as to automatically deactivate the laser light source 5 when intensity of the laser light detected by the proximal photometric sensor 8 deviates/varies at least by 3% with respect to said first reference value, and/or when intensity of the laser light detected by the distal photometric sensor 9 deviates/varies by at least 3% with respect to said second reference value.

The invention claimed is:
1. An automotive lighting apparatus (1) comprising:
   a rear body (2) adapted to be fixed to a vehicle;
   a front half-shell (3) arranged to close the mouth of said rear body (2); and
   at least one lighting assembly (4) which is located inside the rear body (2) and is adapted to backlight, on command, a corresponding transparent or semi-transparent sector of the front half-shell (3);
   said at least one lighting assembly (4) comprising:
      a radially emitting optical fibre (6) of given length; and
      an electrically-powered, collimated light source (5) which is located in front of a proximal end (6a) of the optical fibre (6), and is adapted to direct, towards the same proximal end (6a), a collimated light beam (r) which enters and travels inside the optical fibre (6);
   wherein the at least one lighting assembly (4) further comprises:
      at least one proximal photometric sensor (8) that is arranged beside the collimated light source (5) and/or the proximal end (6a) of the optical fibre (6), so as to capture/detect the light reflected/ scattered on entering into the optical fibre (6);
      at least one distal photometric sensor (9) that is arranged in front of the distal end (6b) of the optical fibre (6) and is adapted to capture/detect the light coming out of the distal end (6b) of the optical fibre (6); and
      an electronic control unit (7) adapted to command the collimated light source (5) on the basis of the signals coming from said proximal (8) and distal (9) photometric sensors.

2. A lighting apparatus according to claim 1, wherein the electronic control unit (7) is adapted to deactivate said collimated light source (5) to interrupt/prevent the emission of said collimated light beam (r) when the ratio between the intensity of the light detected by said at least one proximal photometric sensor (8) and the intensity of the light detected by said at least one distal photometric sensor (9) deviates from a predetermined reference value.

3. A lighting apparatus according to claim 1, wherein the electronic control unit (7) is adapted to deactivate said collimated light source (5) to interrupt/prevent the emission of said collimated light beam (r) when the intensity of the light detected by any one of said photometric sensors (8, 9) deviates from a corresponding predetermined reference value.

4. A lighting apparatus according to claim 1, wherein the proximal end (6*a*) of the optical fibre (6) is arranged spaced in front of the emitter (13) of the collimated light source (5), at a distance (d) from said emitter lower than or equal to 0.5 mm.

5. A lighting apparatus according to claim 1, wherein said at least one lighting assembly (4) additionally includes centering and fixing mechanical members (11) which are adapted to rigidly connect the proximal end (6*a*) of the optical fibre (6) to the collimated light source (5), and are structured to stably keep the proximal end (6*a*) of the optical fibre (6) centred and stationary in front of the emitter (13) of the collimated light source (5).

6. A lighting apparatus according to claim 5, wherein said centering and fixing mechanical members (11) are structured so as to stably keep the proximal end (6*a*) of the optical fibre (6) at a predetermined distance (d) from the emitter of the collimated light source (5) ranging between 0.2 and 0.25 mm.

7. A lighting apparatus according to claim 1, wherein said at least one lighting assembly (4) is provided with at least two proximal photometric sensors (8) that are arranged on opposite sides of the emitter (13) of the collimated light source (5).

8. A lighting apparatus according to claim 1, wherein the emitter (13) of said collimated light source (5) and the proximal photometric sensor(s) (8) are placed/fixed one next to the other, on a printed circuit board (15) which, in turn, is arranged close to the proximal end (6*a*) of the optical fibre (6).

9. A lighting apparatus according to claim 1, wherein the optical fibre (6) has a flexible filiform structure and is supported/sustained by a rigid bearing structure (10, 110) which is integral with the rear body (2).

10. A lighting apparatus according to claim 1, wherein the at least one lighting assembly (4) is provided with at least one temperature sensor (12) which is adapted to detect the temperature of said collimated light source (5).

11. A lighting apparatus according to claim 10, wherein the electronic control unit (7) is connected to said at least one temperature sensor (12), and is adapted to amplify the signals coming from said at least one proximal photometric sensor (8) and/or from said at least one distal photometric sensor (9) as a function of the temperature of said collimated light source (5).

12. A lighting apparatus according to claim 1, wherein the rear body (2) is substantially basin-shaped and is adapted to be at least partially recessed into the bodywork of the vehicle.

13. A lighting apparatus according to claim 1, wherein the lighting apparatus (1) is an automotive headlight or taillight.

14. A control method of an automotive lighting apparatus (1) provided with a lighting assembly (4) that comprises:
   a radially emitting optical fibre (6) of given length;
   a collimated light source (5) which is arranged in front of a proximal end (6*a*) of said optical fibre (6), and is adapted to direct, towards the same proximal end (6*a*), a collimated light beam (r) that enters and travels inside the optical fibre (6);
   at least one proximal photometric sensor (8) which is arranged beside the collimated light source (5) and/or at the proximal end (6*a*) of the optical fibre (6), so as to capture/detect the light reflected/dispersed on entering into the optical fibre (6); and
   at least one distal photometric sensor (9) which is placed in front of the distal end (6*b*) of the optical fibre (6), and is adapted to capture/ detect the light exiting from the distal end (6*b*) of the optical fibre (6);
   wherein the method comprises the steps of:
      determining the intensity of the light reflected/ scattered outside of the optical fibre (6) at the proximal end (6*a*) of the fibre on the basis of the signals coming from said at least one proximal photometric sensor (8);
      determining the intensity of the light exiting from the distal end (6*b*) of the optical fibre (6) of the fibre on the basis of the signals coming from said at least one distal photometric sensor (9); and
      switching off/deactivating the collimated light source (5) as a function of the intensity of the light detected by said at least one proximal photometric sensor (8) and/or of the intensity of the light detected by said at least one distal photometric sensor (9).

15. A control method according to claim 14, wherein the switching off/deactivation of the collimated light source (5) takes place when the ratio between the intensity of the light detected by said at least one proximal photometric sensor (8) and the intensity of the light detected from said at least one distal photometric sensor (9), deviates from a predetermined reference value.

16. A control method according to claim 14, characterized by additionally comprising the step of measuring the temperature of said collimated light source (5), and the step of amplifying the signals coming from said at least one proximal photometric sensor (8) and/or from said at least one distal photometric sensor (9) as a function of the temperature of said collimated light source (5).

\* \* \* \* \*